United States Patent [19]

Saidman et al.

[11] Patent Number: 5,159,894

[45] Date of Patent: Nov. 3, 1992

[54] APPARATUS FOR FORMING A PERMANENT FOAM COATING BY ATOMIZATION ONTO A SUBSTRATE

[75] Inventors: Laurence B. Saidman, Westlake; James C. Smith, Lorain, both of Ohio

[73] Assignee: Nordson Corporation, Westlake, Ohio

[21] Appl. No.: 794,790

[22] Filed: Nov. 19, 1991

Related U.S. Application Data

[60] Continuation of Ser. No. 572,439, Aug. 27, 1990, abandoned, which is a division of Ser. No. 389,671, Aug. 4, 1989, Pat. No. 4,983,424.

[51] Int. Cl.$^5$ .......................... B05C 5/02; B05C 11/11
[52] U.S. Cl. .................................. 118/300; 261/84; 261/DIG. 26
[58] Field of Search ............... 118/300; 427/243, 244, 427/421; 261/28, 83, DIG. 26, 84

[56] References Cited

U.S. PATENT DOCUMENTS

| | | | |
|---|---|---|---|
| 4,059,714 | 11/1977 | Scholl et al. | 428/317.5 |
| 4,247,581 | 1/1981 | Cobbs, Jr. et al. | 427/373 |
| 4,301,119 | 11/1981 | Cobbs, Jr. et al. | 422/133 |
| 4,371,096 | 2/1983 | Scholl et al. | 261/DIG. 26 |
| 4,423,161 | 12/1983 | Cobbs, Jr. et al. | 521/73 |
| 4,505,957 | 3/1985 | Cobbs, Jr. et al. | 427/422 |
| 4,527,712 | 7/1985 | Cobbs, Jr. et al. | 222/1 |
| 4,553,701 | 11/1985 | Rehman et al. | 239/42 |
| 4,599,208 | 7/1986 | Blaak | 261/83 |
| 4,608,398 | 8/1986 | Cobbs, Jr. et al. | 521/113 |
| 4,630,774 | 12/1986 | Rehman et al. | 239/87 |
| 4,632,314 | 12/1986 | Smith et al. | 261/DIG. 26 |
| 4,778,631 | 10/1988 | Cobbs, Jr. et al. | 261/DIG. 26 |
| 4,791,142 | 12/1988 | Pleuse et al. | 261/DIG. 26 |

Primary Examiner—Richard L. Chiesa
Attorney, Agent, or Firm—Wood, Herron & Evans

[57] ABSTRACT

A apparatus of atomizing a high solids viscous composition onto a substrate and foaming the composition comprising mixing a coating composition with a gas forming agent under elevated pressure and temperature. The coating composition is airlessly atomized and projected onto a substrate. The gas remains dissolved in the coating after depositing on the substrate which causes the coating to foam after striking the substrate. The apparatus provides a permanent foam coating composition with uniform cell distribution. The apparatus is particularly suitable for foaming polymeric coatings such as plastisols and foods such as peanut butter or chocolate.

5 Claims, 1 Drawing Sheet

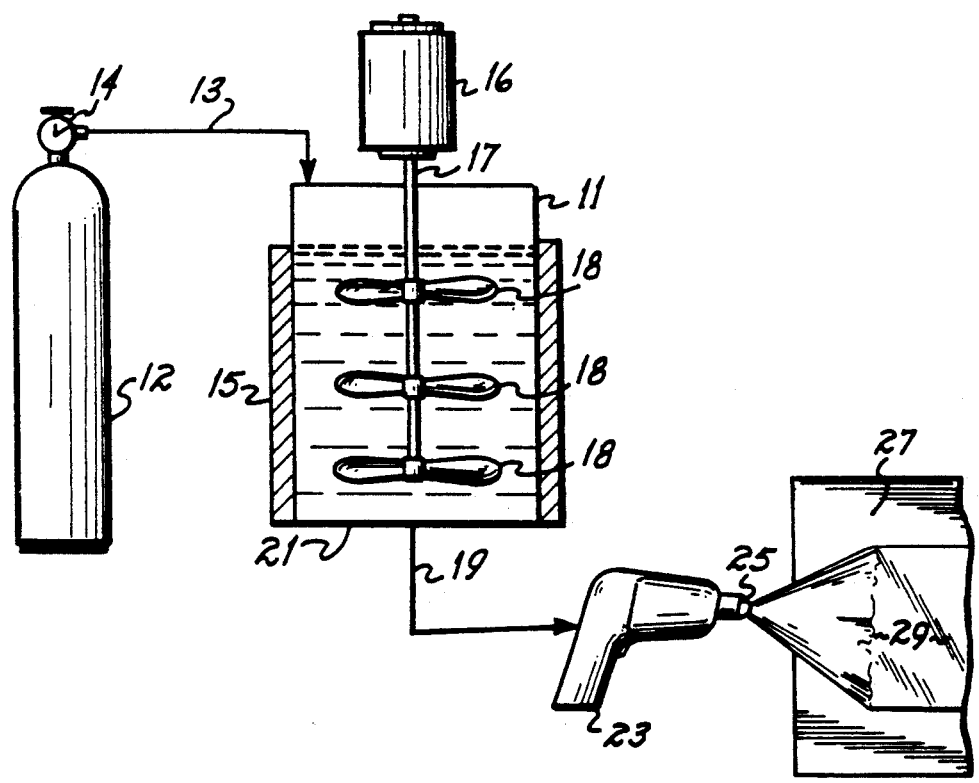

APPARATUS FOR FORMING A PERMANENT FOAM COATING BY ATOMIZATION ONTO A SUBSTRATE

This application is a continuation of application Ser. No. 572,439, filed Aug. 27, 1990, now abandoned, which in turn is a divisional of application Ser. No. 389,671, filed Aug. 4, 1989, now U.S. Pat. No. 4,983,424.

BACKGROUND OF THE INVENTION

Foam has been used in a variety of different coating and adhesive applications. For example, Scholl et al U.S. Pat. No. 4,059,714 discloses applying a thermoplastic adhesive having a gas dissolved in the thermoplastic adhesive. When dispensed at atmospheric pressure the gas is released from solution and a foam is delivered to a substrate for bonding with another substrate. The substrates are bonded by pressing the foamed adhesive therebetween to destroy the cellular structure and distribute the adhesive between the two substrates.

Foaming has also been used as a means to reduce the amount of solvents required to atomize coating compositions. Coating compositions contain a substantial amount of solids which usually are dissolved in a solvent in order to provide for better dispersion of the solids for application to a substrate. Without adequate solubilization and atomization, the formed coating would have a blotchy appearance. Solvents have been used to dissolve the solids thereby making them more fluid, less viscous and easier to atomize. Cobbs, Jr. et al U.S. Pat. No. 4,247,581 discloses foaming coating compositions in order to reduce the need for solvents. According to Cobbs, a stream of foamed coating composition is first formed and then an external atomizing force breaks up the foam on its way to a substrate. Other patents have issued on foaming methods and apparatus. A special foam generating nozzle is disclosed in Rehman U.S. Pat. No. 4,553,701 and U.S. Pat. No. 4,630,774 discloses nozzle designed to air atomize foam emitted from the nozzle. Cobbs U.S. Pat. No. 4,505,957 likewise discloses foam atomization upon emission from the nozzle. Cobbs U.S. Pat. No. 4,423,161 and related U.S. Pat. No. 4,301,119 disclose foam coating. Cobbs U.S. Pat. No. 4,608,398 relates to foam application of thermosetting compositions and Cobbs U.S. Pat. No. 4,527,712 discloses an apparatus for dispensing foamable compositions.

The prior methods of atomizing coating compositions have used foaming as a means to an end, i.e., where the foam is destroyed after delivery from a spray nozzle before it hits the substrate, or immediately thereafter. Particularly in the above Cobbs patents directed to atomization, the objective was to form a smooth continuous coating composition without any surface irregularities such as pin holes on a substrate. For this reason the foam must be destroyed while traveling from the atomizer to the substrate or upon deposition and film forming.

SUMMARY OF THE INVENTION

The present invention is premised on the realization that a permanent foam coating can be formed on a substrate by atomization of a gas-containing coating composition to form atomized particles containing residual dissolved gas. These particles are projected onto a substrate for controlled deposition as a continuous coating containing dissolved gas for expansion to form a permanent foam. The method is especially suited for airless or hydraulic atomization.

In a preferred form, a substrate can be coated with a permanent foam coating by projecting a fan spray of atomized particles of coating composition containing dissolved gas against a substrate. Upon striking the substrate, a continuous coating or layer is formed and the residual gas is released from solution resulting in a foamed coating composition on the substrate. A permanent foam coating can be formed which has a smooth outer surface or skin and a uniform cellular interior.

Surprisingly, an atomized fan spray pattern can be applied from an airless spray nozzle and still provide for permanent foam formation of the composition on the substrate. Further, this method provides for an even distribution of foam cells throughout the foam body.

The present invention as well as further advantages of the present invention will be appreciated in light of the following detailed description and drawings in which:

BRIEF DESCRIPTION OF THE DRAWINGS

The Figure is a diagrammatic depiction of an apparatus suitable for use in practicing the present invention.

DETAILED DESCRIPTION OF THE DRAWINGS

The present invention can be practiced with either a thermoplastic or a thermosetting composition. Common resins of the industrial coatings industry with or without solvents are therefore suitable including methacrylates, acrylates and copolymers thereof, alkyd resins, polyester resins, polyurethanes, epoxies, polyethylenes, ethylenevinylacetate copolymers, polyvinyl chlorides, various rubber compositions and the like. Particular examples of thermoplastic materials include polymers of ethylenically unsaturated monomers such as polyethylene, polypropylene, polybutylene, polystyrene, poly(alphamethylstyrene), polyvinyl chloride, polyvinylacetate, polymethylmethacrylate, polyethylacrylate, polyacrylonitrile and the like, copolymers of ethylenically unsaturated monomers such as copolymers of ethylene and propylene, ethylene and styrene and polyvinylacetate; styrene and maleic anhydride; styrene and methylmethacrylate; styrene and ethylacrylate; styrene and acrylonitrile; methylmethacrylate and ethylacrylate and the like. Other resins include polymers and copolymers of conjugated dienes such as polybutadiene, polyisoprene, polychloroprene, styrene butadiene rubber, ethylene-propylene diene rubber, acrylonitrile styrene butadiene rubber and the like, saturated and unsaturated polyesters, polyamides and polyurethane.

The present invention is particularly suitable for coating compositions which are a suspension or dispersion of small particles in a liquid carrier. One such class of these compositions is plastisols which are a dispersion of small particles of a polymeric substance in a liquid plasticizer. Plastisols contain no volatile thinners or diluents although they may contain stabilizers, fillers, pigments and the like. Another class of compositions are edible compositions such as chocolate, peanut butter and the like which are basically dispersions of proteins and carbohydrates in an oleagenous carrier.

To practice the present invention foaming agents are also required. Foaming agents can be gas or liquid blowing agents, including air, nitrogen, oxygen, carbon dioxide, methane, ethane, butane, propane, helium, argon, neon, fluorocarbons such as dichlorofluoroethane, monochlorotrifluoromethane or other gases or liquids or mixtures of any such. Such blowing agents can be varied again according to the type of compositions which are foamed. For practical purposes the present invention preferably employs inert compositions which are gaseous at room temperature such as carbon dioxide, nitrogen, air and the like.

As is diagrammatically shown in the Figure, the apparatus used to practice the invention is primarily a pressurized mixing vessel 11 having a source of a blowing agent such as air. As shown in the Figure, the gas blowing agent is contained in a tank 12 connected via line 13 to the mixing vessel 11. Valve 14 controls the pressure within the tank. The mixing vessel includes heating jacket 15, a motor 16 with a shaft 17 extending into the pressurized vessel 11. Attached to shaft 17 are a plurality of mixing blades or disks 18 that serve to divide vessel 11 into a series of compartments along its length. The mixer shown in FIGS. 5-7 of U.S. Pat. No. 4,778,631 provides greater detail of an acceptably preferred apparatus and such is incorporated herein by reference; a pump may be used as shown in such detail to force feed said coating material in solution. An outlet line 19 for feeding said solution from the bottom 21 of the vessel 11 extends to airless spray apparatus 23 via line 24. Spray apparatus 23 includes a fan or atomizing spray nozzle 25 adapted to project an atomized fan pattern 26 against the substrate 22. Nozzle 25 is preferably an airless atomizing spray nozzle for projecting an atomized coating 29 over substrate 27. The spray apparatus 23, nozzle 25 and orifice size will vary depending on the material being atomized. Particularly with plastisols and other viscous compositions a nozzle with a large orifice generally 0.010" to 0.060" should be employed. Both cross cut and domed nozzle tips can be employed.

To use the apparatus the coating material is added to the pressurized vessel 11. The vessel is then closed and the blowing agent, for example nitrogen, is added while the coating is heated by jacket 15 and mixed by disks 18. The rotation of the blades 18 mixes gaseous blowing agent into the coating composition for solubilization of the blowing agent in the coating composition. Maintaining the pressure of the mixture of coating composition and blowing agent maintains the blowing agent dissolved or dispersed in the coating composition until the pressure is released.

Throughout this specification and claims the term "solution" is used to describe the liquid polymer containing a "dissolved" gas supplied under high pressure to the dispensing device, which creates a foamed polymeric structure when dispensed at atmospheric pressure. The terms "solution" and "dissolved" are used in the specification and the claims of the application to define and encompass the broader generic definition of solution or dissolution which is a homogeneous mixture of a gas and a molten or liquid polymer, whether or not the gas molecules are in fact dissolved among the polymer molecules.

The coating composition with the foaming agent is forced by gas pressure to apparatus 23 and atomized onto substrate 27. Nozzle 25 in combination with the internal hydraulic pressure causes the liquid to spread outwardly and atomize as it travels to the substrate. Atomized particles of coating composition strike the substrate. As the coating composition passes from nozzle 25, the atomized particles are projected towards the substrate and residual dissolved blowing agent is released, forming a permanent foam coating on the substrate.

Particularly with the highly viscous materials such as plastisols in order to atomize the material overblowing is required. Overblowing is a condition wherein excess foaming agent is employed such that nucleation occurs within an airless nozzle to induce atomization. In order to obtain overblowing it is important that there be sufficient blowing agent. The volumetric ratio of blowing agent (expanded) to coating composition should range from about 3:1 to about 10:1 blowing agent to coating liquid. The nucleating gas bubbles act to break up the liquid of the plastisol or other coating material which in turn permits atomization of the base fluid with the solids simply going along for the ride. Very significantly the foaming agent is retained in the atomized particles of the coating as they are deposited onto the substrate generally with a foam ratio on the order of 1.5:1 to 2:1. The result is a foam coating having an even distribution of cells on the substrate.

Of course, the pressure within the mixing vessel 11 will to a large extent determine the amount of foaming agent which is being added to the composition. Generally the internal pressure within the mixing vessel can range from about 100 to about 3,000 psi with about several hundred psi being preferred depending upon materials foamed. The desired temperature of the coating composition within mixing vessel 11 will of course vary depending upon the composition used and may range from room temperature to over 600° F. and higher. Finally the distance from the nozzle to the substrate can be varied to change the atomization pattern or width. However, this distance must be controlled to contain the blowing agent in the particles prior to striking the substrate. Generally the distance will vary from 3 inches to 2 feet.

This invention may be practiced using the apparatus described in Cobbs U.S. Pat. No. 4,778,631 for dissolving the gas in liquid, preferably the single axis mixer disclosed in FIGS. 5–7. This apparatus is generally shown in the Figure at 15. An airless or hydraulic atomization apparatus having an air assisted nozzle that may be used for atomization is also disclosed in U.S. Pat. No. 4,386,739 and is generally shown in the Figure at 23 and 25. The disclosures of these patents in their entireties are incorporated herein by reference. However, the conditions of atomization with residual gas solution in the atomized particles must be achieved in accord with the principles of this invention to obtain its advantages.

The present invention will be further appreciated in light of the following detailed examples.

EXAMPLE 1

Vinyl Plastisol

The apparatus of FIGS. 5–7 described in U.S. Pat. No. 4,778,631 was used for this example. The mixer was operated at a speed of 100 revolutions per minute with the fluid pressure within the mixer maintained at 600–700 psig. The gas supply pressure was 1100 psig nitrogen and the gas to plastisol ratio was controlled up to 5:1 by volume at standard temperature and pressure.

The vinyl plastisol was atomized at a pressure of 600 to 700 psig through a Nordson nozzle #012-524. The coating continued to foam and expand after striking the substrate. After solidification, an even foam coating was provided with a surface which is relatively free of pin holes. The final density reduction was approximately 33%. Density reduction is calculated by the formula:

$$DR = 100\left(1 - \frac{\text{Density Foamed}}{\text{Density Nonfoamed}}\right)$$

The foam ratio is determined by weighing a defined volume of the foamed material and a defined volume of the non-foamed material and dividing the non-foamed material weight by the weight of the foamed material.

EXAMPLE 2

Vinyl Plastisol

To further test the present invention, a vinyl plastisol was atomized onto heated 12"×12" metal panels. Spraying was done with a batch mixer pressurized to 700 psi with nitrogen and mixed for 15 minutes at 150 rpms. In these tests, two nozzles were selected. A Nordson 024015 nozzle and Nordson 006820, both medium cavity dome style nozzles. The flow rate through the 006820 nozzle in grams per minute was 2,338 at 600 psi producing an 8 inch pattern width 10 inches from the nozzle. The Nordson 024015 nozzle had a flow rate at 600 psi of 4906 grams per minute with a pattern width of 15 inches at 10 inches from the nozzle.

The test panels were preheated to 275°-300° F. and atomization achieved from a handgun with the designated nozzle. The weight of the foam applied to the panels from the Nordson 024015 nozzle varied from 9.6 grams up to 46.2 grams. Using the Nordson 006820 nozzle from 19.5 grams to 113.3 grams were applied. These resulted in a coating thickness of from 3/32" to ⅛". In these tests, the average density reduction was 55%. The hot plastisol coating can be overcoated with a thermoplastic powder coating.

EXAMPLE 3

Peter Pan Brand Creamy Peanut Butter

Peanut butter was added to a pressurized mixing vessel and maintained a temperature of 80°-90° F. with a mixer speed of 50-100 rpm for 20 minutes. The peanut butter was then atomized through a Nordson hot melt 231004 nozzle. Foam peanut butter having a 45 to 48% reduction in density was atomized.

By practicing the present invention one can produce a foam of very viscous coating compositions, such as plastisols, food items such as peanut butter and chocolate. The materials can be projected against a substrate with sufficient excess foaming agent to provide additional foaming on the substrate which provides for a relatively continuous skin layer free of pin holes and the like. By foaming on the substrate, a consistent foam coating is obtained. The invention has particular utility in the foam spray coating of automobile parts to provide sound deadening and other sealing properties.

In view of the above detailed description other embodiments of the present invention should become apparent. Such variations to achieve the advantageous results of this invention will be understood to those of ordinary skill in the art in view of the above description.

What is claimed is:

1. An apparatus for applying a permanent foam coating on a substrate comprising, in combination:
   at least one rotatable shaft including a first series of spaced disks substantially perpendicular to the axis thereof and rotatable therewith about said axis,
   a housing surrounding said shaft and disks,
   said disks serving to divide said housing into a series of compartments along its length,
   liquid coating material inlet means at one end of said housing,
   liquid coating material/gas solution outlet means at the other end of said housing,
   means for introducing a gas into said housing, and
   means for driving said rotatable shaft to cause said disks to rotate to cause mixing of said gas with said coating material within said housing to form said coating material/gas solution upstream of said coating material/gas solution outlet means,
   means for maintaining said gas in solution with said coating material in said apparatus housing, and
   means for atomizing said coating material/gas solution to atmospheric pressure to form atomized particles for projection onto the substrate as a permanent foam coating.

2. The apparatus of claim 1 wherein said atomization means is an airless atomization apparatus.

3. The apparatus of claim 2 wherein said apparatus has an air assisted atomization nozzle.

4. The apparatus of claim 1 further comprising a pump for force feeding said inlet means with said liquid coating material into and through said housing.

5. The apparatus of claim 1 wherein said solution is maintained by means of pressure.

* * * * *